United States Patent Office 3,372,086
Patented Mar. 5, 1968

3,372,086
WATER-SOLUBLE POLYALKYLENEPOLY-
AMINE/DIALDEHYDE RESINS AND AP-
PLICATION THEREOF IN PRODUCTION
OF WET STRENGTH PAPER
Paul M. Westfall, St. Albans, and Nelson R. Eldred, South
Charleston, W. Va., and John C. Spicer, Sidney, N.Y.,
assignors to Union Carbide Corporation, a corporation
of New York
No Drawing. Filed Apr. 14, 1965, Ser. No. 447,980
14 Claims. (Cl. 162—164)

ABSTRACT OF THE DISCLOSURE

A cationic water-soluble resinous reaction product of (a) a polyfunctional halohydrin and (b) a resin produced by reaction of a polyalkylenepolyamine with a saturated aliphatic dialdehyde of 2 to 6 carbon atoms. The product is useful in paper products as wet strength improving agents. The method for incorporation of the novel polymers in paper products as well as the paper products are also novel.

This invention relates to novel cationic water-soluble resinous compositions. More particularly, this invention relates to novel cationic water-soluble polymers produced by reacting a polyalkylenepolyamine with a saturated aliphatic dialdehyde and partially cross-linking the resulting product with a polyfunctional halohydrin. In a specific aspect, the invention relates to the incorporation of the novel polymers in paper products as wet-strength improving agents and comprehends both the improved paper products and methods of producing such products from aqueous suspensions of cellulosic paper-making fibers.

Conventional cellulosic paper products lose their strength rapidly when wetted; for example, the wet strength of ordinary paper is only about five to ten per cent of its dry strength. To overcome this disadvantage, various methods of treating paper products have been suggested in the past. Thus, wet strength can be increased by parchmentizing paper in sulfuric acid solution or by surface-sizing with animal glue and exposing the glue-sized sheet to high temperatures or to a tanning agent to render the protein insoluble in water. Additionally, various resins such as the urea-formaldehyde and melamine-formaldehyde resins, among others, have been employed to enhance wet strength. Many of these prior art methods suffer from serious disadvantages. Thus, the absorbency of the paper may be reduced, or increased stiffness and harshness result, while in some instances the deterioration rate of the paper is increased. Moreover, many serious practical difficulties have been found to arise in the commercial application of such treatments in paper mills.

Resins which are substantive to fibers of hydrated cellulosic material such as aqueous suspensions of paper-making fibers, and can thus be readily applied in the dilute aqueous suspensions encountered in paper mills, are also known to the art. Among the resins of this type which have been employed heretofore are (1) resins produced by reaction of polyalkylenepolyamines with halohydrins, (2) resins produced by reacting polyalkylenepolyamines with saturated aliphatic dibasic carboxylic acids to yield a first stage product with subsequent reaction of this first stage product with a halohydrin and (3) resins produced by reaction of polyalkylenepolyamines with unsaturated aliphatic di- or polycarboxylic acids, or mononuclear aromatic polycarboxylic acids, followed by reaction of the resulting polyamide with a halohydrin.

It has now been found that cationic water-soluble resins that are substantive to paper-making fibers can be produced by reacting a polyalkylenepolyamine with a saturated aliphatic dialdehyde and then reacting the resulting product with a halohydrin. The novel resins produced in this manner are capable of providing wet strength at least equal to that of any of the resins of the prior art as well as improving the dry strength of paper and paper products and have been found to function effectively at low levels of addition and over a wide pH range. In addition to their use as wet and dry strength improving agents, the novel resins disclosed herein find further important application as retention aids, drainage rate improvers, flocculents, white water clarifiers, and so forth.

The cationic water-soluble resins of this invention are produced in a two-stage process. The first stage resin is the product produced by reacting a polyamine with a dialdehyde, while the second stage resin is the product resulting from partial crosslinking of the first stage resin with a halohydrin.

The suitable polyamines for the purpose of this invention are the polyalkylenepolyamines having at least two primary amine groups and at least one secondary amine group. The nitrogen atoms in such polyamines are linked by $-C_mH_{2m}-$ groups, wherein $m$ is a small integer such as 2, 3 or 4, and the molecule may contain from 2 up to about 8 of such groups. Commercially available polyalkylenepolyamines, which are mixtures of linear, branched and cyclic polyalkylenepolyamines, are entirely suitable for use in producing the novel resinous compositions of this invention. Accordingly, the term "polyalkylenepolyamine" as employed herein and in the appended claims is intended to include polyalkylenepolyamines in pure or relatively pure form, mixtures of such materials, and crude polyalkylenepolyamines which are commercial products and many contain minor amounts of other compounds. Illustrative of the suitable polyalkylenepolyamines one can mention the polyethylenepolyamines such as diethylenetriamine, triethylenetetramine, tetraethylenepentamine, pentaethylenehexamine, N-(2-aminoethyl)piperazine, N,N - bis(2 - aminoethyl)-ethylenediamine, diaminoethyl triaminoethylamine, piperazinoethyl triethylenetetramine, and the like. The corresponding polypropylenepolyamines and polybutylenepolyamines can also be employed although the polyethylenepolyamines are preferred for economic reasons.

To prepare the first stage resin of this invention, the above-described polyalkylenepolyamine is reacted with a saturated aliphatic dialdehyde of 2 to 6 carbon atoms, such as, for example, glyoxal, pyruvic aldehyde, succinaldehyde, glutaraldehyde, or 2-hydroxyadipaldehyde. The polyalkylenepolyamine and the dialdehyde are reacted in a proportion of about 0.5 to about 2 moles of polyalkylenepolyamine per mole of dialdehyde at a temperature of about 50° C. to about 20° C. for a period of at least about 30 minutes, and preferably for a period of at least about 60 minutes up to about 6 hours, or more. It is preferred to employ a ratio of about 0.8 to about 1.5 moles, of polyalkylenepolyamine per mole of dialdehyde and a reaction temperature of about 80° C. to about 160° C.

The first stage resin produced by reaction of a polyalkylenepolyamine and a dialdehyde as described above is partially crosslinked with a halohydrin to form the second stage resin, with the crosslinking taking place primarily through secondary amine groups of the first stage resin. In effecting the second stage reaction, the first stage resin is first dissolved in water or other suitable diluent such as methanol, ethanol, 1,4-dioxane, and the like, and the halohydrin is then slowly added to the solution. The suitable halohydrins for the purposes of this invention are the dihalohydrins such as α-γ-dichlorohydrin, dibromohydrin, and di-iodohydrin and monohalohydrins which contain in addition to the halogen a functional group, such as an epoxy group, which is capable of combining with an amine group. Illustrative of this latter class of halohydrins one can mention epichlorohydrin, epi-bromohydrin, epi-iodohydrin, 1,3-dichloro-2-propanol, 1,3-dibromo-2-propanol, and the like. For economic reasons and also because of the particularly desirable results obtained thereby, it is preferred to employ epichlorohydrin in this invention.

The amount of the polyfunctional halohydrin employed in the second stage reaction is an amount sufficient to provide a molar ratio of halohydrin to secondary amine groups of the first stage resin of about 0.5 to about 1.5, and more preferably from about 0.8 to about 1.1. Suitable reaction temperatures for the second stage reaction are in the range from about 20° C., or less, to about 100° C., or more, and preferably within the range from about 40° C. to about 80° C. In carrying out the second stage reaction, the first stage resin is first diluted with a suitable diluent, as described above, to a solids content of from about 5 to 35 percent by weight, more preferably from about 15 to 25 percent by weight, and then the polyfunctional halohydrin is added.

The time required for the second stage reaction will vary from a relatively long period such as about 24 hours, or more, at the lower reaction temperatures to a relatively short period such as about 10 minutes, or less, at the higher reaction temperatures. In general, the exothermic second reaction is continued until the product reaches a viscosity in the range between B and E on the Gardner scale, while the preferred procedure is to terminate the reaction when the viscosity reaches C-Gardner or D-Gardner. This is accomplished by cooling and diluting the resin, preferably with distilled water, to a solids content of about 20 percent or less. The dilute resin solution is then stabilized by adjusting the pH to a value of about 5 or less. This is conveniently accomplished by the addition of an appropriate quantity of acid such as concentrated hydrochloric acid, concentrated sulfuric acid, concentrated phosphoric acid, glacial acetic acid, and the like, or by addition of gaseous carbon dioxide. A considerable proportion of the second stage resin will consist of "inert" material, i.e. material that is ineffective in enhancing wet strength, as a result of the splitting off from the halohydrin of a hydrogen halide which reacts with the amine groups.

The following reaction equations typify the reactions occurring in the two-stage process of preparing the resins of this invention. Equation 1 illustrates the initial step in the first stage reaction of glyoxal with triethylenetetramine while Equation 2 illustrates the subsequent second stage reaction with epichlorohydrin (illustration of the crosslinking being omitted). In the second stage reaction the epichlorohydrin is shown as reacting with all secondary amine groups and not with the terminal primary amine groups of the molecule but in fact reaction with the primary amine groups will, of course, also occur.

The second stage resin of this invention is a cationic water-soluble thermosetting resin that must be cured to a water-insoluble form subsequent to its incorporation in a paper product in order to effect an increase in wet strength. The curing period required to obtain wet strength is dependent on the temperature employed and to a lesser extent on the pH of the paper product. Wet strength may be obtained by allowing the treated paper to air dry at room temperature for a prolonged period, such as a period of 24 hours or more. Generally, the wet strength will continue to increase over about a 30-day period at room temperature before reaching its ultimate value. It is preferred, however, to accelerate the cure of the resin by heating the treated paper product. Such heating is suitably accomplished in the drying stage in the operation of a conventional paper-making machine and modification of the normal drying conditions employed with such machines will not generally be necessary. Drying conditions encountered in commercial paper machine operation are, typically, temperatures of about 85° C. to about 135° C. for periods of about 1 to 4 minutes and such conditions are fully capable of effecting curing of the resins of this invention. Under such conditions the wet strength will continue to improve over a 20 to 30 day period and ultimately will reach about 70 to 80 percent of the strength that could be attained in the laboratory by use of a more prolonged curing period at comparable temperatures.

The wet-strength improving resins of this invention can be utilized in felted fibrous cellulosic materials, such as paper, paperboard, and shaped paper articles, formed from any suitable pulp including bleached and unbleached pulp. Suitable pulp includes sulfite, kraft, soda, groundwood, rag, rope, and jute pulp, etc. The pulp can contain a minor amount of conventional, synthetic paper-making fibers. Conventional fillers such as, for example, clay, calcium carbonate, titanium dioxide, talc, calcium silicate, barium sulfate, and the like, can also be incorporated in the paper product. The resins are effective in improving the wet strength of paper products when added to the cellulosic paper-making fibers in small amounts. Thus, the resin can be added in an amount of from about 0.05 percent, or less, to about 5 percent or more, based on the weight of the fibers, and is preferably employed in an amount of from about 0.2 to about 3 percent. The resin can be applied as a "tub-size," i.e., an aqueous solution of the resin can be applied to the sheeted paper by dipping, rolling, padding, etc., or at the beater or "wet-end" stage by introducing the resin to the aqueous paper-making furnish at any time prior to sheet formation. The wet-strength papers of this invention can be employed in absorbent products such as toweling, facial tissue, and saturating papers and in sized and unsized products employed as packaging, paper bags, bond and envelope papers, and paperboard, or wherever paper of high wet strength finds suitable application.

The specific examples which follow are given to further illustrate the invention, it being understood that these ex- (1)

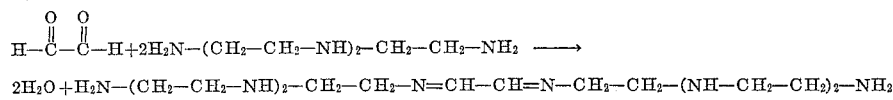

$2H_2O + H_2N-(CH_2-CH_2-NH)_2-CH_2-CH_2-N=CH-CH=N-CH_2-CH_2-(NH-CH_2-CH_2)_2-NH_2$ (2)

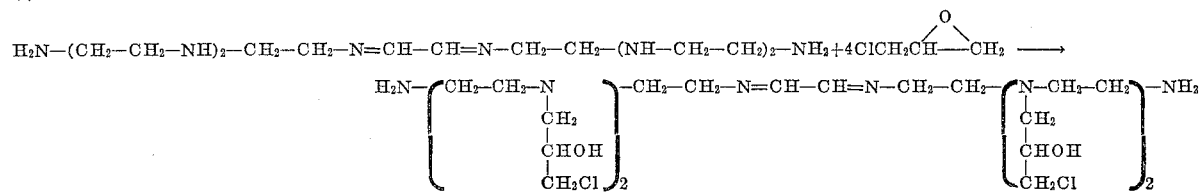

amples are not intended to be limiting of the invention but merely illustrative thereof. Solids content values reported are in all cases in terms of active solids. In each instance the polyalkylenepolyamine employed was a commercial grade material and thus consisted of a mixture of linear, branched and cyclic compounds.

Example 1

To a four-necked 500 ml. reaction flask equipped with a mechanical stirrer, thermometer, dropping funnel, and condenser there was charged 0.30 mole of tetraethylenepentamine and then 0.20 mole of aqueous glyoxal was added dropwise over a 40 minute period, with the temperature resulting from the exothermic reaction being maintained at 40 to 50° C. by controlling the rate of addition. The temperature of the reaction flask was increased gradually and the water stripped off at 150° C. After holding the temperature at 150° C. for approximately 2 hours, the resulting resinous reaction product was dissolved in distilled water and diluted to 20 percent solids. The flask temperature was adjusted to about 50° C. and then 0.90 mole of epichlorohydrin was added dropwise over a 40 minute period with the heat of the exothermic reaction being removed by cooling so as to maintain the temperature at 50 to 60° C. After completion of the addition of the epichlorohydrin, the solution was heated at 75° C. for 1 hour and 30 minutes and at 85° C. for 30 minutes and then distilled water was added to dilute to a solids content of 3 percent.

Example 2

To the apparatus of Example 1 there was charged 0.20 mole of glyoxal hydrate in solid form and the flask was then cooled in an ice-bath to 15° C., 0.30 mole of triethylenetetramine was added and the temperature was gradually increased to about 50° C. After approximately 10 minutes at 50° C., the reaction rate increased and the temperature rose rapidly to 90° C. due to the exothermic reaction. The mixture was stirred until the temperature dropped to 50° C. and then distilled water was added to dilute to a solids content of 20 percent, and 0.60 mole of epichlorohydrin was added to the solution in a dropwise manner with the temperature held at 50 to 60° C. by cooling. The solution was then heated at 85° C. for approximately 2 hours and the resulting resin diluted to 3 percent solids content by addition of distilled water.

Example 3

To the apparatus of Example 1 there was charged 0.24 mole of tetraethylenepentamine and then 0.20 mole of glutaraldehyde, as a 25 weight percent aqueous solution, was added dropwise over a 10 minute period with a resulting increase in the temperature to 60° C. because of the heat of reaction. After completion of the addition of the glutaraldehyde, the temperature was gradually increased and the water stripped off and then the reaction mixture was maintained under a reduced pressure of 100 mm. of Hg and a temperature of 150° C. for 1.5 hours. The resulting orange-colored resin was dissolved in 220 ml. of distilled water, the temperature was adjusted to 50° C. and 0.65 mole of epichlorohydrin was added dropwise over a 10 minute period, with the flask being cooled to maintain a temperature of 50 to 60° C. After completion of the addition of the epichlorohydrin, the solution was heated to 70 to 75° C. for 30 minutes, at which point the solution viscosity equaled C-Gardner. Distilled water was then added to dilute to a solids content of one percent and the pH was adjusted to 4.3 by addition of concentrated hydrochloric acid.

The resins prepared in Examples 1 to 3 above were evaluated as paper wet-strength additives. In the evaluation procedure employed, a sample of moist pulp (unbleached kraft pulp) of sufficient size to provide 2.61 grams of bone dry pulp was diluted with distilled water to a pulp content of 1.6 percent by weight. The pulp slurry was then placed in a mechanical mixer, the wet-strength resin was added, and the pulp was agitated for a period of 15 minutes. After the agitation, the pulp slurry was placed in a handsheet mold, sufficient water was added to make a total slurry of 12 liters and a handsheet was prepared and dried. The resin was cured for a period of 3 hours at a temperature of 105° C. and then the handsheet was conditioned overnight at 23° C. in an atmosphere with 50 percent relative humidity. Tensile strengths, both wet and dry, were measured on a table model Instron tensile tester; the tensile strength being defined as the force required to break a strip of paper having a standard width of 15 millimeters and being reported in kilograms/15 millimeters. The wet tensile strength was determined after soaking the sample in water for at least 16 hours. Results of the evaluation are presented in Table I below, with the wet tensile strength for a control sample that contained no wet-strength resin being included for comparison purposes.

TABLE I

| Resin | Level of Addition [1] | Basis Weight [2] | Dry Tensile Strength (Kg./15 mm.) | Wet Tensile Strength (Kg./15 mm.) | Percent Wet Strength [3] |
|---|---|---|---|---|---|
| Control | 0 | 46.3 | 5.4 | 0.27 | 5 |
| Example 1 | 1.5 | 48.8 | 7.1 | 2.41 | 34 |
| Example 2 | 1.5 | 45.9 | 6.8 | 1.56 | 23 |
| Example 3 | 1.0 | 46.4 | 5.6 | 1.93 | 30 |

[1] Percent by weight of dry pulp based on active solids in resin.
[2] Weight in pounds of a standard ream containing 500 sheets, each sheet being 25 x 38 inches.
[3] Percent wet strength = $\frac{\text{Wet tensile strength}}{\text{Dry tensile strength}} \times 100$.

Consideration of the above results indicates that the novel resins described herein are highly effective wet strength agents for paper and paper products at low levels of addition. Moreover, these resins function effectively over a pH range of from about 4 to about 10 and can be readily applied to paper and paper products without changing the operating conditions employed in commercial paper mills.

What is claimed is:
1. The cationic water-soluble resinous reaction product of (a) a polyfunctional halohydrin and (b) a resin produced by reaction of a polyalkylenepolyamine with a saturated aliphatic dialdehyde of 2 to 6 carbon atoms.

2. The cationic water-soluble resinous reaction product of (a) a polyfunctional halohydrin and (b) a resin produced by reaction at a temperature of about 50° C. to about 200° C. of about 0.5 to about 2 moles of polyalkylenepolyamine per mole of a saturated aliphatic dialdehyde of 2 to 6 carbon atoms, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C.

3. The cationic water-soluble resinous reaction product of (a) a polyfunctional halohydrin and (b) a resin produced by reaction at a temperature of about 80° C. to about 160° C. of about 0.8 to about 1.5 moles of polyalkylenepolyamine per mole of a saturated aliphatic dialdehyde of 2 to 6 carbon atoms, the molar ratio of said polyfunctional halohydrin to secondary amine groups of said resin being from about 0.8 to about 1.1 and the reaction of said polyfunctional halohydrin and said resin being conducted at a temperature of from about 40° C. to about 80° C.

4. The cationic water-soluble resinous reaction product of (a) epichlorohydrin and (b) a resin produced by reaction at a temperature of about 80° C. to about 160° C. of about 0.8 to about 1.5 moles of a polyalkylenepolyamine selected from the group consisting of triethylenetetramine and tetraethylenepentamine per mole of glyoxal, the molar ratio of epichlorohydrin to secondary amine groups of said resin being from about 0.8 to about 1.1 and the reaction of epichlorohydrin and said resin being conducted at a temperature of from about 40° C. to about 80° C.

5. The cationic water-soluble resinous reaction product of (a) epichlorohydrin and (b) a resin produced by reaction at a temperature of about 80° C. to about 160° C. of about 0.8 to about 1.5 moles of tetraethylenepentamine per mole of glutaraldehyde, the molar ratio of epichlorohydrin to secondary amine groups of said resin being from about 0.8 to about 1.1 and the reaction of epichlorohydrin and said resin being conducted at a temperature of from about 40° C. to about 80° C.

6. In the manufacture of paper products from cellulosic paper-making fibers, the improvement which comprises incorporating in said fibers from about 0.05 to about 5 percent, based on the weight of said fibers, of a cationic water-soluble resinous reaction product of (a) a polyfunctional halohydrin and (b) a resin produced by reaction of a polyalkylenepolyamine with a saturated aliphatic dialdehyde of 2 to 6 carbon atoms and subsequently curing said resinous reaction product to a water-insoluble form.

7. In the manufacture of paper products from cellulosic paper-making fibers, the improvement which comprises incorporating in said fibers from about 0.05 to about 5 percent, based on the weight of said fibers, of a cationic water-soluble resinous reaction product of (a) a polyfunctional halohydrin and (b) a resin produced by reaction at a temperature of about 50° C. to about 200° C. of about 0.5 to about 2 moles of polyalkylenepolyamine per mole of a saturated aliphatic dialdehyde of 2 to 6 carbon atoms, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C., and subsequently applying heat to cure said resinous reaction product to a water-insoluble form.

8. In the manufacture of paper products from cellulosic paper-making fibers, the improvement which comprises incorporating in said fibers from about 0.2 to about 3 percent, based on the weight of said fibers, of a cationic water-soluble resinous reaction product of (a) a polyfunctional halohydrin and (b) a resin produced by reaction at a temperature of about 80° C. to about 160° C. of about 0.8 to about 1.5 moles of polyalkylenepolyamine per mole of a saturated aliphatic dialdehyde of 2 to 6 carbon atoms, the molar ratio of said polyfunctional halohydrin to secondary amine groups of said resin being from about 0.8 to about 1.1 and the reaction of said polyfunctional halohydrin and said resin being conducted at a temperature of from about 40° C. to about 80° C., and subsequently applying heat to cure said resinous reaction product to a water-insoluble form.

9. In the manufacture of paper products from cellulosic paper-making fibers, the improvement which comprises incorporating in said fibers from about 0.2 to about 3 percent, based on the weight of said fibers, of a cationic water-soluble resinous reaction product of (a) epichlorohydrin and (b) a resin produced by reaction at a temperature of about 80° C. to about 160° C. of about 0.8 to about 1.5 moles of a polyalkylenepolyamine selected from the group consisting of triethylenetetramine and tetraethylenepentamine per mole of glyoxal, the molar ratio of epichlorohydrin to secondary amine groups of said resin being from about 0.8 to about 1.1 and the reaction of epichlorohydrin and said resin being conducted at a temperature of from about 40° C. to about 80° C., and subsequently applying heat to cure said resinous reaction product to a water-insoluble form.

10. In the manufacture of paper products from cellulosic paper-making fibers, the improvement which comprises incorporating in said fibers from about 0.2 to about 3 percent, based on the weight of said fibers, of a cationic water-soluble resinous reaction product of (a) epichlorohydrin and (b) a resin produced by reaction at a temperature of about 80° C. to about 160° C. of about 0.8 to about 1.5 moles of tetraethylenepentamine per mole of glutaraldehyde, the molar ratio of epichlorohydrin to secondary amine groups of said resin being from about 0.8 to about 1.1 and the reaction of epichlorohydrin and said resin being conducted at a temperature of from about 40° C. to about 80° C., and subsequently applying heat to cure said resinous reaction product to a water-insoluble form.

11. A paper product of improved wet strength comprising cellulosic paper-making fibers containing from about 0.05 to about 5 percent, based on the weight of said fibers, of a cationic resinous composition obtained by reacting (a) a polyfunctional halohydrin with (b) a resin produced by reaction of a polyalkylenepolyamine with a saturated aliphatic dialdehyde of 2 to 6 carbon atoms, to produce a water-soluble reaction product and subsequently curing said reaction product to a water-insoluble form.

12. A paper product of improved wet strength comprising cellulosic paper-making fibers containing from about 0.2 to about 3 percent, based on the weight of said fibers, of a cationic resinous composition obtained by reacting (a) a polyfunctional halohydrin with (b) a resin produced by reaction at a temperature of about 80° C. to about 160° C. of about 0.8 to about 1.5 moles of polyalkylenepolyamine per mole of a saturated aliphatic dialdehyde of 2 to 6 carbon atoms, the molar ratio of said polyfunctinal halohydrin to secondary amine groups of said resin being from about 0.8 to about 1.1 and the reaction of said polyfunctional halohydrin and said resin being conducted at a temperature of from about 40° C. to about 80° C., to produce a water-soluble reaction product and subsequently applying heat to cure said reaction product to a water-insoluble form.

13. A paper product of improved wet strength comprising cellulosic paper-making fibers containing from about 0.2 to about 3 percent, based on the weight of said fibers, of a cationic resinous composition obtained by reacting (a) epichlorohydrin and (b) a resin produced by reaction at a temperature of about 80° C. to about 160° C. of about 0.8 to about 1.5 moles of a polyalkylenepolyamine selected from the group consisting of triethylenetetramine and tetraethylenepentamine per mole of glyoxal, the molar ratio of epichlorohydrin to secondary amine groups of said resin being from about 0.8 to about 1.1 and the reaction of epichlorohydrin and said resin being conducted at a temperature of from about 40° C. to about 80° C., to produce a water-soluble reaction product and subsequently applying heat to cure said reaction product to a water-insoluble form.

14. A paper product of improved wet strength comprising cellulosic paper-making fibers containing from about 0.2 to about 3 percent, based on the weight of said fibers, of a cationic resinous composition obtained by reacting (a) epichlorohydrin and (b) a resin produced by reaction at a temperature of about 80° C. to about 160° C. of about 0.8 to about 1.5 moles of triethylenetetramine per mole of glutaraldehyde, the molar ratio of epichlorohydrin to secondary amine groups of said resin being from about 0.8 to about 1.1 and the reaction of epichlorohydrin and said resin being conducted at a temperature of from about 40° C. to about 80° C., to produce a water-soluble reaction product and subsequently applying heat to cure said reaction product to a water-insoluble form.

References Cited
UNITED STATES PATENTS 2,926,116  2/1960  Keim _____ 162—164

S. LEON BASHORE, *Primary Examiner.*